United States Patent [19]

Lichtman et al.

[11] Patent Number: 4,884,880

[45] Date of Patent: Dec. 5, 1989

[54] KIT FOR CONVERTING A STANDARD MICROSCOPE INTO A SINGLE APERTURE CONFOCAL SCANNING EPI-ILLUMINATION MICROSCOPE

[75] Inventors: Jeffrey W. Lichtman; William J. Sunderland, both of St. Louis, Mo.

[73] Assignee: Washington University, St. Louis, Mo.

[21] Appl. No.: 243,353

[22] Filed: Sep. 14, 1988

Related U.S. Application Data

[63] Continuation-in-part of Ser. No. 120,641, Nov. 16, 1987, which is a continuation-in-part of Ser. No. 100,468, Sep. 24, 1987, abandoned.

[51] Int. Cl.$^4$ .................. G02B 21/00; G02B 21/06; G02B 26/02
[52] U.S. Cl. .................................. 350/507; 350/527; 350/266
[58] Field of Search ................ 350/62, 319, 507, 523, 350/524, 526, 527, 528, 266, 272, 273, 275, 450, 442, 520, 321; 356/152

[56] References Cited

U.S. PATENT DOCUMENTS

| | | |
|---|---|---|
| 3,664,751 | 5/1972 | Haas ..................................... 350/511 |
| 3,926,500 | 12/1975 | Frosch et al. ........................ 350/527 |
| 4,062,623 | 12/1977 | Suzuki et al. ....................... 350/236 |
| 4,215,934 | 8/1980 | Karasawa et al. .................. 350/442 |
| 4,323,299 | 4/1982 | Roberts .............................. 350/523 |
| 4,359,282 | 11/1982 | Garrison ............................. 350/507 |

*Primary Examiner*—Rodney B. Bovernick
*Assistant Examiner*—Ronald M. Kachmarik
*Attorney, Agent, or Firm*—Rogers, Howell & Haferkamp

[57] ABSTRACT

A kit to convert a standard epi-illumination microscope into a single aperture confocal scanning epi-illumination microscope comprises an assembly including, in one embodiment, a pair of intermediate lenses to create a second field plane conjugate to the specimen plane in both the incident and reflected light paths, with a single aperture positioned at this second conjugate field plane and controllably scanned through the plane to create the incident light beam as well as to mask the returning light before viewing. In a second embodiment, only a single lens is included in the assembly and the objective lens may be positioned at its correct tube lengt, or a non-standard objective lens may be used to prevent undesired degradition of the image. This assembly conveniently mounts to the nosepiece of the standard microscope in place of the objective lens, and the objective lens mounts to the assembly.

23 Claims, 4 Drawing Sheets

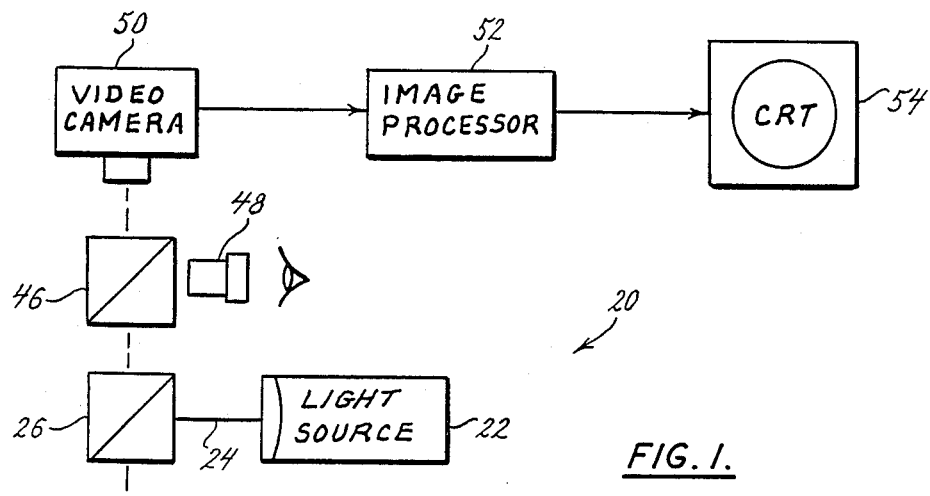
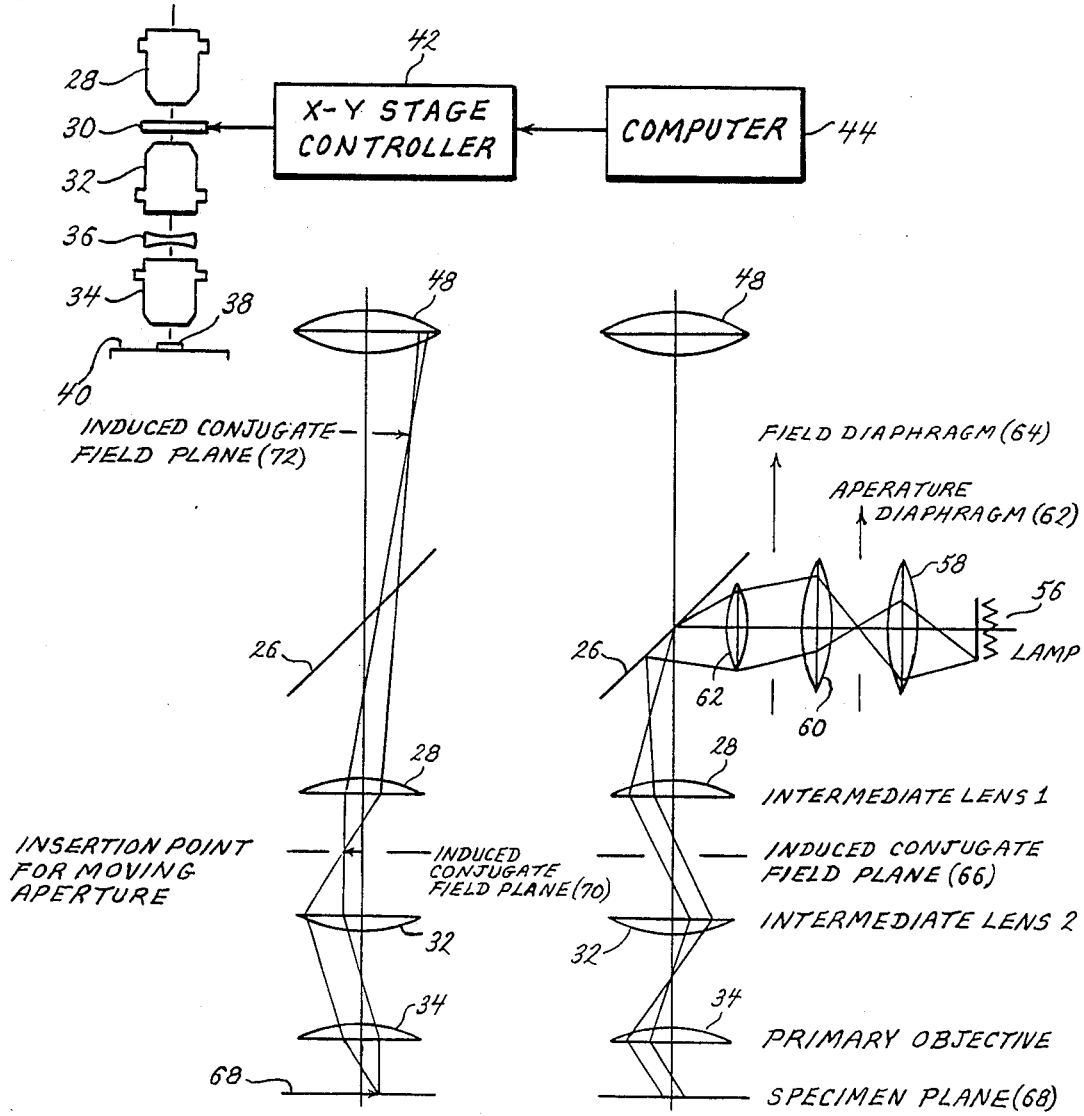

KIT FOR CONVERTING A STANDARD MICROSCOPE INTO A SINGLE APERTURE CONFOCAL SCANNING EPI-ILLUMINATION MICROSCOPE

CROSS-REFERENCE TO RELATED APPLICATIONS

This application is a continuation-in-part of Ser. No. 07/120,641 filed Nov. 16, 1987, which is a continuation-in-part of Ser. No. 07/100,468 filed Sept. 24, 1987, now abandoned.

BACKGROUND AND SUMMARY OF THE INVENTION

Confocal scanning microscopes are well known in the art. There are two types of these, one being the epi-illumination type which reflects light from a specimen and the other being the transillumination type which transmits light through a specimen. The present invention relates to microscopes of the epi-illumination type. These microscopes provide improved resolution by illuminating only a small portion of the specimen at a time, and masking the returning (reflected or fluorescence) light to view only that same small portion to minimize the effects of scattered and out of focus light from surrounding portions of the specimen. The entire specimen is viewed by scanning the specimen in small increments and coalescing these increments either in real time or with a video camera and image processor or the like. Several examples of microscopes utilizing this technique are shown in prior U.S. Pat. Nos. 3,013,467; 3,518,014; 3,547,512; 3,926,500; 4,170,398; 4,323,299, the disclosures of which are incorporated herein by reference.

In most of these prior patents, the approach has been to utilize a first aperture for the incident light, or otherwise collimate the incident light into the desired scanning pattern such as by a focused laser, and a second, separate, aperture for the returning light, the incident and returning light generally having different paths through the microscope. In the prior art, these apertures were typically either slit or pin hole type, and there are various techniques in the prior art for synchronizing these apertures as they are moved to completely map the specimen and thereby create a complete image thereof.

One such technique utilizes the Nipkow disc, which is a disc typically containing over 32,000 holes, each about 50 microns in diameter, and arranged as a series of Archimedian spirals. In operation, the disc is spun to rotate a series of complex, precisely aligned holes in one side of the Nipkow disc across the incident light beam to create the incident light scan. The returning light is directed back along a different path through the opposite side of the Nipkow disc which contains a symmetrical set of complex, precisely aligned holes to mask the out-of-focus light. In other words, the Nipkow disc contains pairs of precisely aligned holes or apertures, each hole in the incident light path having a corresponding hole for the returning light path. In the Nipkow disc, great care must be taken to create each hole exactly the same size and shape, and in a perfectly symmetrical pattern to obtain an evenly illuminated field, and then it must be aligned such that each hole and its corresponding hole pair are perfectly aligned to illuminate and view the same part of the specimen at the same time. As might be expected, Nipkow discs are quite expensive to make in the first place and, once made, great care must be taken to mount them properly and control their movement to ensure proper operation of the microscope. Furthermore, a change in the magnification of the primary objective requires a change in the Nipkow disc to one having holes of different sizes.

As shown in the prior art patents mentioned above, there are other solutions to aligning the sets of apertures in these tandem confocal scanning microscopes. However, all of these devices suffer from the inherent problems involved in not only creating a pair of apertures which are exactly the same size and shape, but also coordinating the movement of the aperture pair with the separate light paths for the incident and returning light to create a high resolution, high quality image. Because of the requirement for dual apertures that are precisely aligned with themselves and the two light paths, there is an inherent limitation in the ability of the manufacturers to produce consistently high quality microscopes. Furthermore, these microscopes are significantly more expensive than microscopes not using this technology and require much more fine tuning and adjustment to maintain the image quality.

One of the patents mentioned above, U.S. Pat. No. 3,926,500, discloses a confocal scanning microscope utilizing a single pin hole diaphragm placed at a field plane which is conjugate to the specimen plane in both the incident and reflected light and thus represents an advance over the tandem confocal scanning microscopes explained above. With this arrangement, a Nipkow disc is not required and there is no need to carefully match and line up pairs of apertures. However, this microscope design utilizes a first lens in the incident light path only for focusing the light through the objective lens onto the specimen and a second lens in the reflected light path only which focuses the image of the specimen at the observation plane. With this arrangement, it is quite inconvenient to change the magnification of the microscope. Either one of two approaches might be made to effect a change in magnification. The first of these would be to change the image forming lens which receives only reflected light. However, if this primary focal lens is changed, there is no corresponding change in the illumination of the specimen and this can seriously degrade the image. Changing the illumination is particularly important in scanning microscopes because an image is created by brief exposure of light to each small area of the specimen illuminated through the aperture. With brief illumination, high intensity light is absolutely necessary to view the specimen whether by film, video camera or eye. Thus, not only the image forming lens, but some other lens in the incident light path must also be changed in order to properly condense the light to match the new image forming lens.

A second way magnification can be changed is by changing the power of the primary objective. Although a change in the primary objective eliminates the problem mentioned above with regard to illumination as it receives both incident and reflected light, other adjustments are required. As the ideal aperture size for confocal imaging is determined by the magnification and numerical aperture of the primary objective, a change in the primary objective must also be accompanied by a change in the aperture size in order to ensure proper confocal imaging. Thus, the aperture or pin hole size in the diaphragm would need to be changed each time the magnification is changed. Therefore, the inventors believe that the arrangement for the microscope shown in this reference is not readily adaptable to most microscopy applications because of its lack of versatility.

The inventors herein are also aware of a microscope which utilizes mirrors and extra lenses to create a conjugate field plane at a point proximate to the eyepiece thereof. Mirrors are placed in the returning light path only and reflect the light perpendicularly thereto for a distance to locate the created image plane physically away from the eyepiece for clearance purposes. At this conjugate image plane, various kinds of accessories, including a video or still camera, may be interfaced to provide greater versatility for viewing and recording the specimen. In essence, this conjugate field plane serves as an optical port for accessing the viewed specimen. However, this optical port may be used with any type of microscope, and does not have any effect on the image created by the microscope.

Despite all of the difficulties involved in the design and use of confocal scanning microscopes, and their rather significant expense, they provide significant improvement over the images which may be obtained through the use of an ordinary epi-illumination microscope. Indeed, in the last several years, there has been renewed interest in the use of confocal scanning microscopes as an instrument to aid in the investigation of biological and physical phenomena. Because of this increased interest in confocal scanning microscopes, there has developed a significant demand for these microscopes. Presently, they are commercially available but, as mentioned above, are generally many times more expensive than an ordinary microscope because of the manufacturing and tolerance problems related above.

In order to solve these and other problems in the prior art, the inventors herein have succeeded in designing and developing a kit for converting a standard epi-illumination microscope into a confocal scanning epi-illumination microscope which uses a single aperture for massing not only the incident light, but also the returning light. An extra lens or lenses are positioned between the body of the microscope and its primary objective lens to create a conjugate field plane for both the incident and reflected light in the light path between the specimen plane and the beam splitter, and an aperture is provided for placement within this conjugate field plane so that the incident and returning light are necessarily in focus both at the aperture (conjugate field plane) and the specimen (specimen plane). Lastly, means are provided to controllably scan the aperture across the specimen as required to achieve a true confocal scanning microscope. With this new arrangement, a standard microscope has not only been easily and inexpensively converted into a confocal scanning microscope, but this new arrangement provides advantages over all of the known, presently commercially available confocal scanning microscopes.

With the arrangement achieved by mounting the kit of the present invention to a standard microscope, a tremendous advantage is obtained over the tandem confocal scanning microscopes in the prior art in that only a single aperture need be manufactured and aligned with a single light path. This completely eliminates the problem in aligning pairs of apertures with a pair of light paths, an inherently much more complex problem. In principle, the modified microscope is comprised of a standard microscope with a kit mounted thereto. The standard epi-illumination microscope contains a light source which provides an incident light beam, a beam splitter which may be a dichroic mirror, and a stage to move the specimen. In one embodiment, the kit includes a first or intermediate lens system which focuses the incident light at a first field plane, an aperture positioned at that first field plane, and a second intermediate lens system which defocuses the incident light into the microscope's standard objective lens, the objective lens refocusing the incident light at a plane where the specimen is positioned (specimen plane). The returning light then retraces the same path through both of the intermediate lens systems and the same single aperture back to a beam splitter which may be a half-silvered mirror or the like where it is separated from the incident light and focused by an eyepiece lens, standard camera, video camera, or the like. Thus, both of the incident and reflected light traverse both of the intermediate or extra lens systems, and the microscope continues to be compatible with its own and other standard lenses.

In essence, with this arrangement a second conjugate field plane for both the incident and returning light is formed at the aperture, this second field plane being conjugate to the specimen plane such that the specimen is illuminated with a light beam whose size and shape is determined by the size of the aperture and the lenses creating the conjugate field plane, the light being in focus both at the aperture and at the specimen. As a magnifying objective is positioned between the aperture and the specimen, the actual size of the light beam illuminating the specimen is smaller than the size of the aperture. Magnification of the microscope may be changed by merely replacing the first intermediate lens system. In this way the aperture size need not be changed as magnification changes as is required in other confocal scanning microscope designs. Moreover, the change in magnification is automatically accompanied by a concomitant change in the illumination as the size of the illuminating beam is condensed by the same lens.

The inventors herein also note, and disclose, still another embodiment for a kit which can be used to convert a standard microscope into a confocal scanning microscope, and which utilizes only one additional standard objective lens. However, in this embodiment, either the physical arrangement of the lenses or the performance of the microscope is not as convenient or desirable as in the first embodiment. As is well known in the art of microscopy, standard objective lenses are rated with a particular magnification, numerical aperture, tube length, and working distance. The tube length represents the distance between the back focal plane of the lens and another focal plane behind the lens at which light of all wavelengths are in focus, that focal length thereby being the location for the color corrected focal plane. In a typical standard objective lens, this length is 160 mm. As can be appreciated, if the second standard objective lens is inserted in line with the original standard objective lens, then the effective length of the microscope is virtually doubled, making the microscope somewhat unwieldy and inconvenient for proper laboratory use. Secondly, if there are no changes to the other lenses used in the microscope, then a phenomenon known as empty magnification may occur where excessive magnification of the specimen renders the image unintelligible. However, if lower power lenses are utilized at the other lens positions to correct for empty magnification, then it is quite possible to create a confocal scanning microscope with the addition of only one standard objective lens placed at the proper tube length.

In an alternate version of this embodiment, the primary objective lens may be placed closer to the aperture than would ordinarily be dictated by the tube length, but this would have an effect on the working distance of the lens and might possibly reduce it to such an extent as to make the microscope unusable. As known in the art, the working distance represents that distance between the front of the lens and the front focal plane of the lens where the specimen is to be placed for proper viewing. In a typical standard objective lens, this distance may be 0.17 mm. As can be appreciated, significant reduction in this distance would interfere with viewing of some specimens which are contained between glass slides, or the like. Additionally, there would be chromatic aberration in the image as the different wavelengths of light would not all be in focus at the same plane. In other words, the microscope could be focused for green but then be out of focus for blue and red. However, if the application would not require use of more than one wavelength or color component, or if the chromatic aberration is minimal for a particular application, then this would not detract from the operation of the microscope and it could be successfully achieved with standard lenses.

While all of the above embodiments utilize standard objective lenses, it is to be understood that special lenses could be designed and built in order to solve the tube length, working distance, and chromatic aberration problems inherent in the embodiments utilizing only one extra lens. However, this would eliminate the very significant advantage of a user being able to utilize his inventory of standard lenses in the microscope, an inventory which may include quite a number of special purpose lenses acquired at substantial cost for particular applications. The converted microscope would thus not be very versatile compared with the other embodiments and the cost could be quite significant to design and build such a special objective lens. The inventors therefore believe that this embodiment is not as desirable as the other embodiments disclosed and claimed herein.

Although it is important that the conjugate field plane be created for both incident and reflected light traversing the path between the specimen plane and the beam splitter, the inventors disclose embodiments wherein the physical location of the conjugate field plane is at different positions. In some of the inventors' embodiments, the conjugate field plane is physically aligned along an axis extending between the eyepiece, beam splitter, and specimen. These embodiments require that the stage be low enough to allow the additional lenses and field plane to be inserted between the nose piece and stage. In other embodiments, a set of mirrors are provided and positioned to reflect both the incident and reflected light a distance away from the microscope centerline. By canting the mirrors properly, the stage need not be particularly low and greater clearance may be obtained for accessing the conjugate field plane such a might be desired to interchange apertures. The mirrors in the principle axis of the microscope might also be formed on opposite sides of a single element to minimize the height of the microscope.

An aperture of any shape, such as a pin hole or slit or the like may be positioned at the coincident field plane to create the scanning beam for illuminating the specimen and also for masking the returning light. With this single aperture arrangement, many advantages are realized. For example, as mentioned above, there is no further need to create an aperture device which comprises two sets of precisely aligned holes or slits. Furthermore, there is no need to precisely align that pair of holes or slits with a pair of light paths, there being only one light path for both incident and returning light. Additionally, the manufacturing tolerances for a single aperture can be relaxed as the single aperture masks both the incident and returning light and must therefore be, by definition, fully and completely coincident. Replacement of the aperture may be easily accommodated merely by removing the first aperture and replacing it with any other aperture. The only requirement is that it be positioned at and aligned within the conjugate field plane. As compared with the tandem confocal scanning microscopes in the prior art, replacement of the aperture becomes a simple task as the problem of aligning the aperture is dramatically simplified.

This converted single aperture confocal scanning epi-illumination microscope made with the kit of the present invention is not only much less expensive than buying a "regular" confocal scanning microscope, but it is also of much higher quality in that manufacturing tolerances and alignment of the aperture do not have a dramatic effect on the quality of the image produced by the microscope.

While the principal advantages and features of the present invention have been explained, a more thorough understanding thereof may be obtained by referring to the drawings and description of the preferred embodiment which follow.

BRIEF DESCRIPTION OF THE DRAWINGS

FIG. 1 is a diagrammatic view of the single aperture confocal scanning epi-illumination microscope formed by installation of the kit of the present invention to a regular epi-illumination microscope;

FIG. 2 is a partial view of the optics portion of the microscope with light rays drawn in to represent the incident light;

FIG. 3 is a partial view of the optics of the microscope with light rays drawn in to represent the returning light;

DETAILED DESCRIPTION OF THE PREFERRED EMBODIMENT

Figure 4:
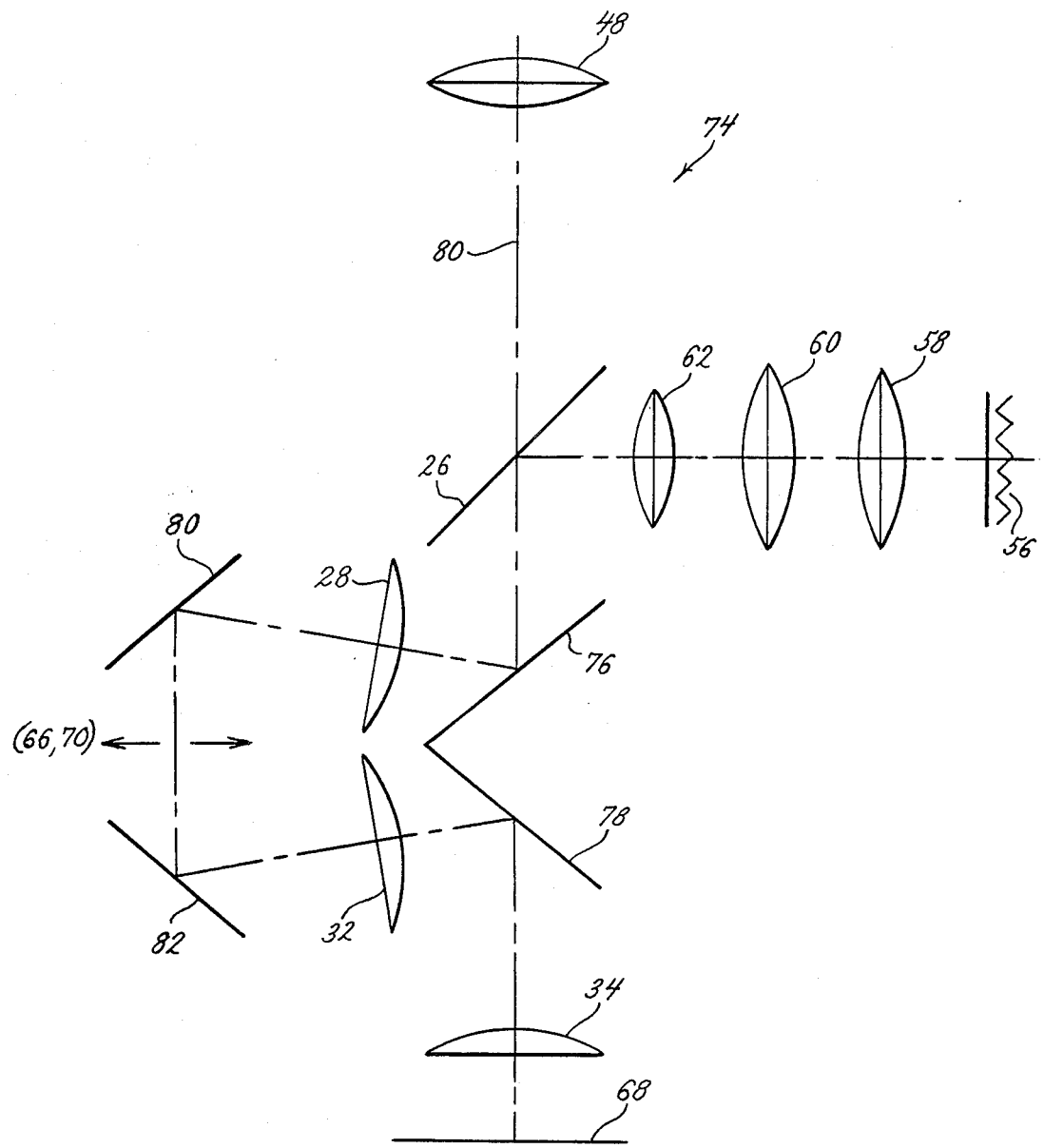
FIG. 4 is a diagrammatic view of the optics of the second embodiment of the present invention utilizing mirrors to relocate the conjugate field plane out of the vertical optical axis of the microscope.

As best shown in FIG. 1, the first embodiment of the kit as installed on a standard epi-illumination microscope results in the single aperture confocal scanning epi-illumination microscope 20. As shown therein, a light source 22 produces a beam of incident light 24 for illuminating the specimen. A beam splitter such as a half-silvered mirror or the like 26 reflects the incident light 24 through a first, standard objective, intermediate lens 28 which focuses the incident light at a first field plane where an aperture 30 is positioned. The aperture 30 may comprise a single pin hole or spot, a rectangular slit, an Archimedian spiral of holes, or any other suitable aperture as is known in the art of confocal scanning microscopes. A second intermediate lens 32, which may also be a standard objective lens, defocuses the incident light into the standard objective lens 34 of the microscope 20. A negative or diverging lens 36 may be placed between lenses 32, 34 to correct for the tube lengths of lenses 32 and 34, as is known in the art. The inventors have utilized matched 10x, EF, 160 mm standard objective lenses for lenses 28, 32. It is noted that lenses 28, 32 are utilized to create the field plane at aperture 30 for both incident light and light returning from the specimen 38 mounted on the stage 40. Thus, both incident and reflected light traverse lenses 28, 32. If the lenses 28, 32 are matched, there is greater assurance that the same effect is given to the light as it passes through both lenses. However, excellent images may be obtained with a simple plano-convex lens replacing lens 32. Furthermore, the magnification of the microscope 20 may be changed by merely replacing lens 28 with a lens having a different power. This is because both incident and reflected light traverse lens 28, and lens 2B is "above" the aperture and specimen. A means to move the aperture 30 (rotating Nipkow disc, slits, or spots) is included. If a rectilinear scan of a pinhole aperture is desired, an X-Y stage controller 42 and matched computer 44 which are well known in the art for controlling the movement of a microscope stage could serve. The inventors have found that such a controller may also be used for controlling the movement of aperture 30 within the conjugate field plane to achieve the scanning of the aperture across the specimen 38 as desired herein. A second half-silvered mirror or the like 46 may be utilized to divert the reflected light either into an eyepiece 48 for direct viewing of the specimen 38, or for directing the light to video camera 50 which produces a plurality of images reconstructed by an image processor 52 for display on a CRT 54 or the like.

In practice, the inventors have found that the X-Y stage controller 42 may be a part No. 517MF as manufactured by Stahl Research Laboratories, and that the aperture may be mounted to a 22 mm stage as manufactured by Artek. Also, a light source producing blue, green, or ultraviolet light may be utilized for light source 22, and the specimen 38 may be dyed such that incident light impinging on specimen 38 induces fluorescence of a different wavelength to facilitate its separation from incident light by standard fluorescence excitation and barrier filters near the half-silvered or dichroic mirror 26. However, it is to be understood that these particular components are merely examples of those which might be utilized by one of ordinary skill in the art and that other equivalent devices for achieving separation of incident from reflected light may also be used without departing from the spirit and scope of the invention. For example, bright field epi-illumination may also be carried out with an aperture in a surface that does not reflect light into the ocular or whose reflections are blocked by cross polarization.

As shown in FIG. 1, those items which comprise the kit for converting the ordinary microscope into the single aperture confocal scanning microscope 20 include intermediate, standard objective lenses 2B, 32; aperture 30; X-Y stage controller 42; and computer 44. As an option, the negative or diverging lens 36 may also be included to correct for the tube length of lenses 32, 34, as mentioned above. Typically, a standard, laboratory use, epi-illumination microscope would include the other components as shown in FIG. 1. The mechanical positioning and layout of a commercial embodiment of the kit 21 as installed on an ordinary microscope is more fully explained below and shown in FIG. 5.

As best shown in FIGS. 2 and 3, a conjugate field plane for both incident and returning light is created as it traverses the space between the mirror 26 and the specimen by lenses 28, 32, both of which are in the light paths for incident and reflected light. This is more easily understood by referring first to FIG. 2 which represents the incident light. Typically, a light source 22 includes a lamp 56 for creating the illumination, a first lens 58 and second lens 60 which accommodate the placement of an aperture diaphragm 62 for adjusting the intensity of the incident light and also creating a field plane for the placement of a field diaphragm 64 to permit adjustment of the incident light beam size. A third lens 62 provides further control for focusing the incident light. As mentioned, these components are typically included within a Kohler illumination type light source 22, as known in the art. The incident light is then reflected by half-silvered or dichroic mirror 26 through the first intermediate lens 28 which creates a field plane 66 of the incident light for insertion of the aperture. This field plane 66 is conjugate to the field plane created at the specimen, or specimen plane 68. Field plane 64 is also conjugate to field plane 66. This minimizes the potential for inadvertent misalignment of the light source such that a good quality illuminating beam is formed.

As best shown in FIG. 3, the image forming path of the returning light essentially retraces the same path as the incident light traversed between the mirror 26 and specimen plane 68. However, the intermediate lens 32 acts to refocus the returning light and induce a field plane 70 which is conjugate to the specimen plane 6B. It is noted that the induced conjugate field plane 70 for the returning light is coincident with the induced conjugate field plane 66 of the incident light such that an aperture placed at this coincident conjugate field plane has the same effect upon the incident light as it does upon the returning light. Additionally, another conjugate field plane 72 is induced such that an eyepiece 48 may be used to replicate the magnified specimen at the viewer's eye, or a video camera or film (see FIG. 1) may be used to replicate the specimen as necessary to record an image.

As shown in FIG. 4, a microscope arrangement 74 can be formed by adding to the kit 21 a first pair of mirrors 76, 78 which are placed at an acute angle in the light path for both incident and reflected light. These mirrors reflect the light out of the optical axis or centerline 80 of the microscope 74 and through the intermediate lenses 28, 32. A second pair of mirrors 82, 84 are then used to bounce the incident and reflected light back in alignment to create the conjugate field plane 66, 70 at a point physically removed from the optical axis of centerline 80. As is well known to those in the art, the angles at which mirrors 76, 78, 82, 84 are positioned are virtually limitless and can be used to greatly vary the distance between mirrors 82, 84 and thereby increase the physical accessibility to the conjugate field planes 66, 70, as desired. Also, the lateral distance between the conjugate field planes 66, 70 and the optical axis or centerline BU may be changed as desired.

Figure 5:
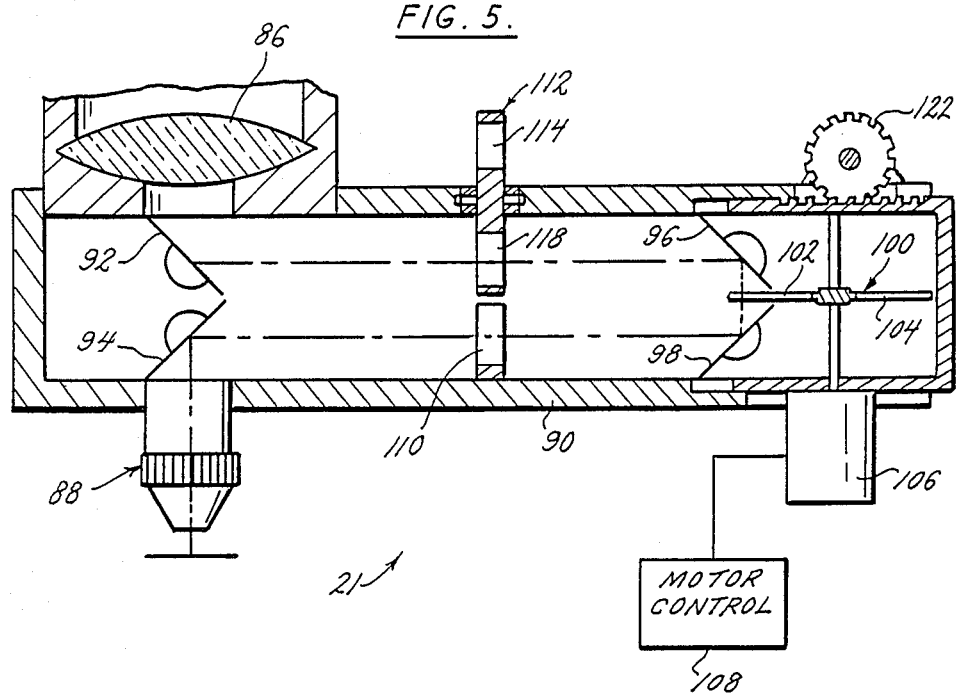
FIG. 5 is a side view of a version of the kit installed on a standard microscope.
Figure 6:
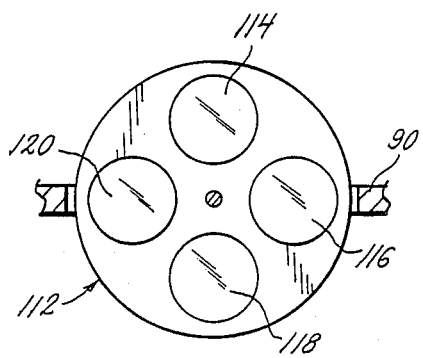
FIG. 6 is a cross-sectional view taken along the plane of line 6—6 in FIG. 5 showing the interchangeable lens.
Figure 7:
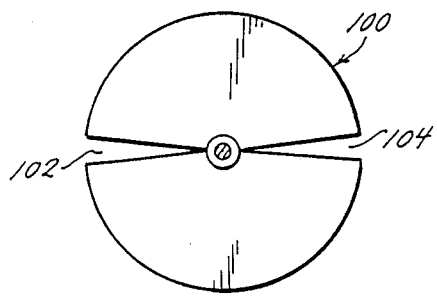
FIG. 7 is a cross-sectional view taken along the plane of line 7—7 in FIG. 5 detailing the aperture with the wedge-shaped slots.

As shown in FIGS. 5, 6, and 7, an embodiment of the kit 21 is attached to the nosepiece 86 of a standard epi-illumination microscope with the microscope's standard objective lens 88 being secured to the kit 21. Therefore, the kit 21 interfits between the nosepiece B6 and the standard objective lens 88 in the manner shown. The kit 21 includes a generally elongated assembly 90 having a first pair of mirrors 92, 94 which divert the incident and reflected light along the length of the assembly 90. A second pair of mirrors 96, 98 direct the incident and reflected light through a spinning aperture 100 which takes the form of a circular disc having a number of wedge shaped, radially aligned slits 102, 104. The aperture 100 is rotated by motor 106 and controlled by motor control 10S. At a midpoint in the assembly 90 is mounted a lower fixed lens 110 and an upper rotatable wheel 112 (see FIG. 6) having four separate lenses 114, 116, 11B, 120; any one of which may be rotated into position in the light path. Lens 110 corresponds to lens 28 and lenses 114–120 correspond to lens 32 in FIG. 1 and perform a like function as explained above. Changing lenses with rotatable wheel 112 achieves a change in magnification and illumination of the specimen. A mechanical positioning device 122 mounted atop the outboard end of assembly 90 permits repositioning of the aperture 100 with respect to mirrors 96, 98. This permits adjustment of the optical sectioning viewed by the microscope as the average width of apertures 102, 104 (see FIG. 7) through which the light traverses is changed due to their wedge shape, thereby changing the size of the scanning light beam. The smaller the width of the apertures 102, 104 used to mask the incident and reflected light, the smaller the depth of the optical section obtained.

Figure 8:
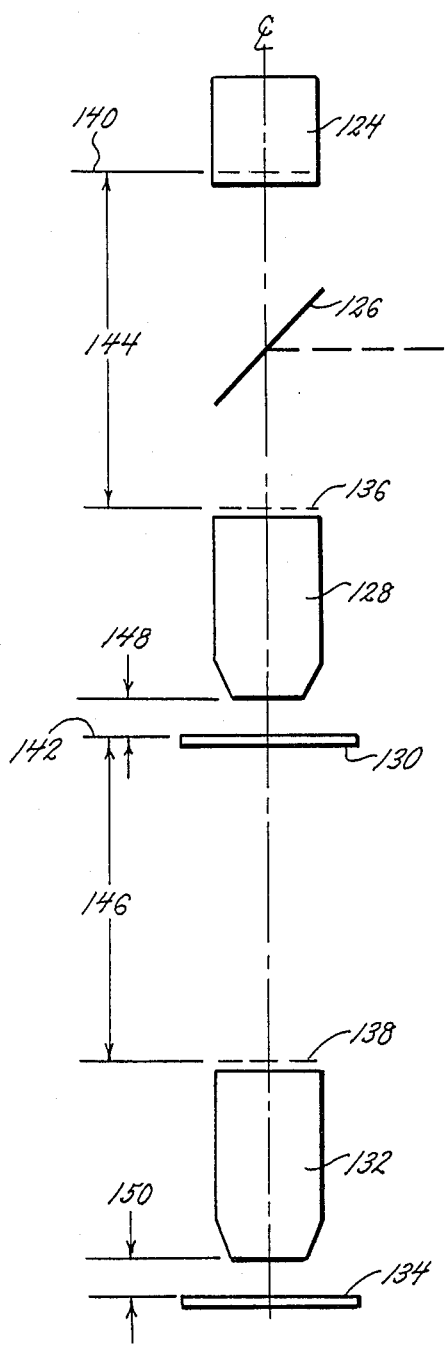
FIG. 8 is a diagrammatic view of the optics of the third embodiment of the present invention utilizing only one extra standard objective lens positioned at its correct tube length.

Still another embodiment of the invention disclosed and claimed herein is shown in FIG. 8 and includes a standard eyepiece 124, a beam splitter 126, a standard objective lens 128, an aperture means 130, a second standard objective lens 132, and a specimen plane 134. Other components of the standard microscope are not shown in FIG. 8 for purposes of clarity. As noted previously herein, each standard objective lens 128, 132 has a tube length representing the distance between the back focal plane 136, 138 respectively at each of lenses 128, 132 and its focal plane 140, 142 wherein a color corrected image is formed. As shown in FIG. 5, this requires a physical separation represented by arrows 144, 146 corresponding to mounting tubes which may, in some instances, render the resulting microscope unwieldy or inconvenient for use. However, a major advantage can be realized in the embodiment in FIG. 8 in that only a single extra standard objective lens 128 is required to create the field plane at aperture 130 both for incident light, and reflected light as the standard objective lens 132 need not be paired with the second intermediate lens, such as lens 32 as shown in FIG. 1 in order to correct for the tube length. For purposes of illustration, arrows 148 and 150 represent the working distances for the standard objective lenses 12B, 132. The full rated working distance of each of these lenses 128, 132 can be realized as the geometry of the microscope is arranged to make use of the full tube length rating of each lens.

Figure 9:
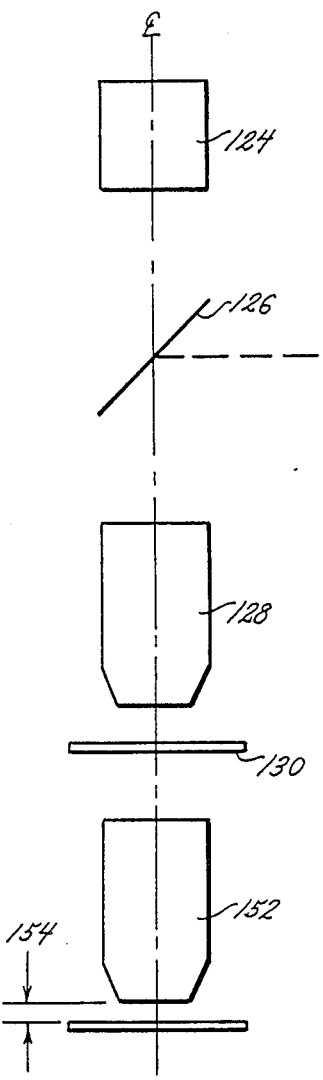
FIG. 9 is a diagrammatic view of the optics for two alternate versions of the third embodiment showing either a standard or specially ground objective lens placed relatively closer to the aperture.

An alternate version of the embodiment shown in FIG. 8 is shown in FIG. 9 and includes the same lens 124, 128 and beam splitter 126 along with aperture 130 all oriented in their same relative physical positions. However, lens 152 may be either a standard objective lens or a specially ground lens, either one of which is oriented physically closer to the aperture 130 to render the microscope more compact and more readily usable in a manner similar to other standard microscopes presently commercially available. If lens 152 is a standard objective lens, then, as explained above, color aberrations may be induced in the resultant image and a reduced working height, as represented by the distance between arrows 154, may be experienced with the risk that the working height is reduced to a dimension so small as to render the microscope virtually unusable for many applications.

If lens 152 is a specially designed and manufactured lens having a reduced tube length, then the working distance and color aberration problems may be overcome with some sacrifice in the versatility of the microscope in that lens 152 may not be interchanged with other standard objective lenses.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A kit for converting a standard microscope for viewing a specimen into a confocal scanning microscope, the standard microscope including a light source for producing incident light for illuminating the specimen, a beam splitter means for separating incident light from light returning from the specimen, and an objective lens for focusing the light at a plane whereat the specimen is positioned (specimen plane), the kit comprising optic means to create a field plane in the incident light path, a means to re-position the objective lens to create a field plane in the returning light path, said field planes being conjugate to the specimen plane, an aperture means, the aperture means being positioned at the conjugate field planes, and means to controllably scan the aperture means within the conjugate field plane.

2. The kit of claim 1 wherein the optic means comprises a standard objective lens.

3. The kit of claim 2 wherein the kit further comprises means to position the standard objective lens at a distance substantially equal to its tube length.

4. The kit of claim 2 wherein said optic means lens and the microscope objective lens are both traversed by both incident and reflected light, the 5. The device of claim 4 wherein the kit further comprises a second optic means positioned between the microscope objective lens and the aperture means, said second optic means having means to permit placement of the microscope objective lens closer to the aperture means than its tube length without degradation of the image.

6. The kit of claim 4 further comprising means to divert both the incident and returning light to thereby position the conjugate field planes in an offset manner to the microscope.

7. The kit of claim 1 wherein the kit further comprises a non-standard objective lens to use in place of the microscope objective lens. conjugate field planes created thereby being coincident.

8. The kit of claim 1 wherein the aperture scanning means comprises a motor, and a computer means to control said motor.

9. The kit of claim 1 wherein the optic means is positioned between the microscope objective lens and the beam splitter means of the standard microscope.

10. The kit of claim 9 wherein the conjugate field planes are coincident thereby requiring only one aperture means.

11. The kit of claim 10 wherein the microscope objective lens is attached to the microscope by screwing it thereinto, the kit having means to screw into the microscope in place of the microscope objective lens, and means for the objective lens to screw into the kit.

12. A kit for converting a standard epi-illumination microscope for viewing a specimen into a reflected light confocal scanning microscope (RLCSM), the standard microscope including a light source for producing incident light for illuminating the specimen, a beam splitter means for separating incident light from light returning from the specimen, and an objective lens for focusing the light at a plane whereat the specimen is positioned (specimen plane); the kit comprising an assembly for attachment between the objective lens and the microscope, the assembly being thereby positioned in both the incident and returning light paths, the assembly including means to create a single field plane conjugate to the specimen plane, an aperture means positioned at the conjugate field plane, and means to controllably scan the aperture means within the conjugate field plane.

13. The kit of claim 12 wherein the assembly further comprises means to divert the incident and returning light to thereby accommodate the positioning of the aperture means remote from the microscope.

14. The kit of claim 13 wherein the conjugate field plane creating means comprises a pair of lens means, one lens means of the pair being positioned on each side of the aperture means.

15. The kit of claim 14 wherein the assembly has means to facilitate the replacement of the aperture means.

16. The kit of claim 14 further comprising means to facilitate changing one of said lens means to thereby change the magnification of the microscope.

17. The kit of claim 14 further comprising means to adjust the effective size of the aperture means to thereby adjust the optical section viewed by the microscope.

18. A kit for converting a standard epi-illumination microscope for viewing a specimen into a reflected light confocal scanning microscope (RLCSM), the standard microscope including a light source for producing incident light for illuminating the specimen, a beam splitter means for separating incident light from light returning from the specimen, and an objective lens for focusing the light at a plane whereat the specimen is positioned (specimen plane); the kit comprising an assembly for attachment between the objective lens and the microscope, the assembly including a plurality of mirrors to divert both the incident and reflected light along the same path and through the assembly, a pair of lenses positioned in the light path in the assembly to define a field plane conjugate to the specimen plane, said field plane being thereby conjugate in both the incident and returning light path, means to interchange one of said lenses to thereby change the magnification of the microscope, an aperture means, means to mount said aperture means at the conjugate field plane, and means to controllably scan the aperture means through the conjugate field plane.

19. The kit of claim 1, wherein the assembly further comprises means to adjust the physical positioning of the aperture means with respect to the light path to thereby adjus the optical section viewed by the microscope.

20. A method for converting a standard epi-illumination microscope into a reflected light confocal scanning microscope (RLCSM) comprising the step of interfitting the kit of claim 18 between an objective lens and a nosepiece of a standard epi-illumination microscope.

21. A kit for converting a standard microscope for viewing a specimen into a confocal scanning microscope, the standard microscope including a light source for producing incident light for illuminating the specimen, a beam splitter means for separating incident light from light returning from the specimen, and an objective lens for focusing the light at a plane whereat the specimen is positioned (specimen plane), the kit comprising an assembly for mounting directly to the microscope and between the microscope and the objective lens, the assembly including a pair of matched lens sets for creating a field plane conjugate to the specimen plane, an aperture means positioned at the conjugate field plane, means to controllably scan the aperture means within the conjugate field plane, and a set of mirrors mounted within the assembly to divert both the incident and reflected light substantially perpendicular to the light path within the microscope and through the matched lens sets and aperture means.

22. The kit of claim 21 wherein one of said matched lens sets comprises a plurality of lens sets, said plurality of lens sets being mounted to a mechanical lens changer, and means to move said mechanical lens changer to thereby place any one of said plurality in the optical path to thereby change the magnification of the microscope.

23. The kit of claim 22 wherein said plurality of lenses comprise the matched lens set positioned between the aperture means and the beam splitter, the other matched lens set being positioned between the aperture means and the microscope objective lens.

* * * * *